Oct. 3, 1961     V. L. ARMSTRONG     3,002,295
DEVICE FOR TEACHING NUMBER CONCEPTS
Filed Oct. 27, 1958

INVENTOR.
VERNON L. ARMSTRONG
BY John E. Reilly
ATTORNEY

United States Patent Office 3,002,295
Patented Oct. 3, 1961

3,002,295
DEVICE FOR TEACHING NUMBER CONCEPTS
Vernon Lee Armstrong, 6390 Brentwood, Arvada, Colo.
Filed Oct. 27, 1958, Ser. No. 769,769
9 Claims. (Cl. 35—31)

This invention relates to an educational toy or teaching aid to develop an understanding of number concepts, and is adaptable especially for use by children.

It is customary in the teaching of number concepts to draw a comparison between a physical number of objects and the symbolic number, or numeral, representing the physical number. This well known method of course enables the young student to more readily grasp the meaning and application of numerals and also stimulates his interest. The above is very often accomplished by the placement of a number of physical objects in association with numerals so that the student by counting the number of objects will arrive at a number corresponding with the associated numerals.

In accordance with the present invention, it is proposed to combine the physical objects with the numerals in a unique way so as to enable a more direct comparison and, as a consequence, a better understanding of the relationship which exists between various numbers of physical objects and the numerals representing each particular number of objects. In addition, it is made possible to utilize the combination proposed in the solution of basic arithmetical problems, including addition, subtraction, multiplication and division. Moreover, in the solution of basic arithmetical problems, through the application of the present invention the student can formulate the answer through the same operation employed in the learning of basic number relations and is thus able to apply his basic learning directly to the learning of more advanced but fundamental arithmetical problems.

The present invention further permits the construction of a more simplified but comprehensive educational aid wherein a single or multiple series of combined objects and numerals are arranged in a unique manner in the learning of number concepts and the solution of basic arithmetical problems and further, wherein color comparisons may also be made in matching physical numbers with their corresponding numerals.

It is therefore an object of the present invention to provide for an educational device for teaching children fundamental arithmetic, beginning with the physical and numerical relationship between numbers and incorporating the above desirable features.

It is another object to provide a portable, compact and more simplified educational device to enable children to progressively increase their learning of the relationship between symbolic and physical numbers, including the application of this relationship to the solution of basic arithmetical problems.

It is a further object to enable children to more readily grasp the meaning of numerals and to directly apply this relationship to the solution of basic arithmetical problems and wherein provision is made for an educational device which is simple to manipulate and which can be easily and economically manufactured.

It is a still further object to provide, through the construction and arrangement in a unique way of numbered units in a single series, for the solution of basic arithmetical problems including addition, subtraction, multiplication, and division; and moreover to establish a more direct comparison between numerals and physical units to that in the solution of any problem the answer is formulated in the same manner.

With the above and other objects in view the present invention comprises certain novel features in its construction and arrangement as will be hereinafter more fully described in the following description taken together with the accompanying drawings, in which.

Figures 1, 2:
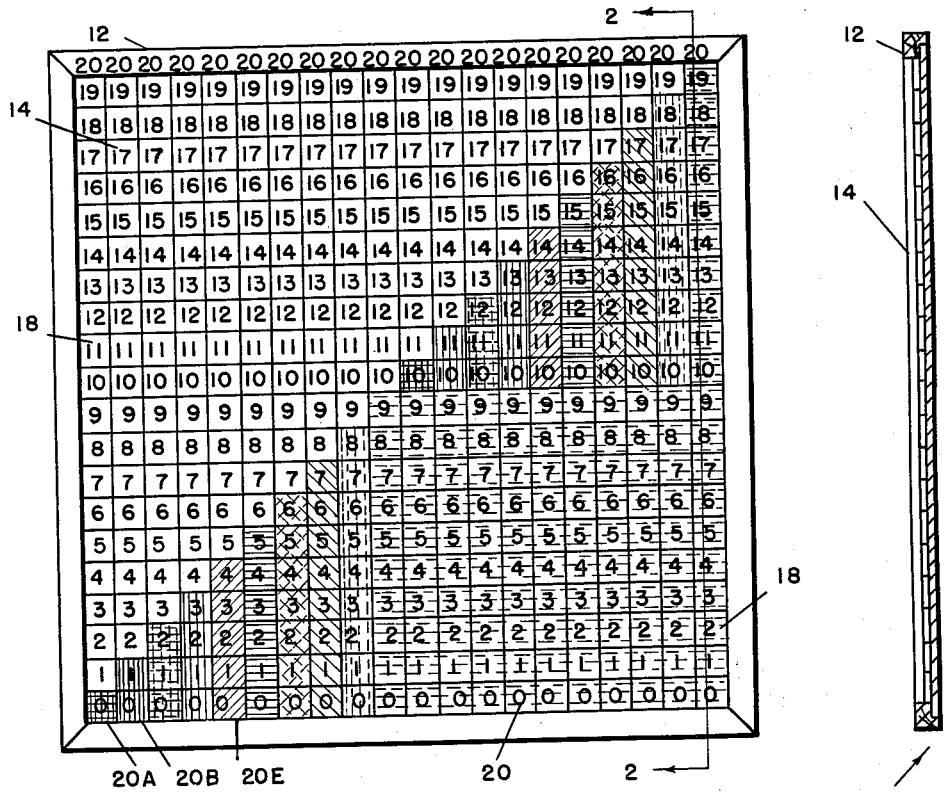
FIGURE 1 is a top plan view of an answer board forming a portion of a preferred embodiment of the present invention.
FIGURE 2 is a second view taken on line 2—2 of FIG. 1.

With more particular reference to the drawings, there is shown, by way of illustration and not limitation, a preferred form of the present invention broadly comprised of an arithmetic answer board 10, which is designed in the form of a rectangular frame or base panel, having a raised outer edge 12 surroundfing an inset portion or compartment 14 which is adapted to receive a series of blocks or movable members 16 therewithin.

The board 10 together with the blocks 16 may be composed of any conventional materials such as wood or metal and the blocks are dimensioned to be a trifle thicker than the depth of the compartment with respect to the top surface of the outer edge 12 so as to permit ease in placement and removal.

The compartment 14 forms a flat surface which is lineated into a number of rectangular, preferably square, elements or objects 18 which define a plurality of vertically extending rows 20. The elements in each row are numbered and in a distinct way so that the numeral associated with each of the elements designates the physical number of objects or elements preceding it. This is accomplished preferably by numbering the elements, starting from the bottom of the board, beginning with the number "0" with the numbers progressing upwardly in ascending sequential order. For example, the numeral "2" indicates that two objects or elements, numbered "1" and "0," precede it. Moreover, each of the rows are essentially the same and are shown numbered from 1 to 20 with the numerals "20" appearing on the outer edge portion 12 of the board 10; and, in this connection, it will be evident that any given number of numerals may be provided, but due to the compactness of the board 10, it is preferred to present the greatest numbers of numerals possible to permit as many operations by the student, in combining numerals, as possible.

In order to enable the beginner to establish an immediate comparison between the blocks 16 and the elements 18 on the board, the elements in each row 20 are colored so that a predetermined number of elements 18 in each row through the tenth row are of a different color and thereafter the color cycle repeats itself from the eleventh to 20th rows if desired. In addition, the elements 18 are colored in stepped relation laterally across the board so that only the element numbered "0" in row 20A is colored and in row 20B the first two elements numbered "0" and "1" are colored, and so on progressively across the board.

Figure 3:
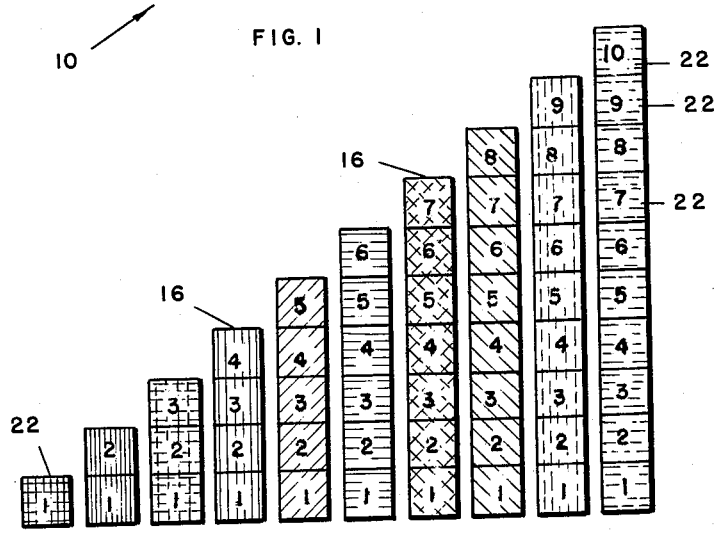
FIGURE 3 represents a series of blocks arranged in stepped relation for use in combination with the answer board of FIG. 1, in accordance with the present invention.

The blocks 16 are each constructed to cover a predetermined number of numerals in each row on the board. In addition, as will be noted in FIG. 3, the blocks are divided into a number of connected segments or units 22 wherein each of the units 22 is numbered preferably beginning with the numeral "1" and conform in size to the size of the elements 18. Moreover, each block section is colored to correspond with a particular row on the answer board. Thus, the blocks numbered from "1" to "5" are colored to correspond with row 20E wherein the elements from "0" to "4" are colored. It will be apparent that the purpose of coloring is primarily to provide, as previously mentioned, a direct relationship for the beginner between the blocks and elements on the board and it is not an essential part of this invention that the blocks and corresponding elements be colored in the manner described. Also, the blocks need not be numbered although the numbering of each individual unit in a block in ascending sequential order permits the student to see the relationship between the numbers while working out solutions to a particular problem. Moreover, the units in each block may be divisable into a number of separate units.

In teaching basic number relations by use of the device of the present invention it is only necessary to impress upon the student that when a certain physical number of elements is covered by a corresponding physical number of units 22 in a block 16, this physical number will be reflected by the numeral which appears above the uppermost unit, or upper end of the block. For example in placing the block numbered from "1" to "5" in the row 20E, the student by counting the number of units starting from the bottom will count 5 units in the block which will be represented by the numeral "5" appearing above the block. In this way, number relations can be established from 1 through 20 through use of a single block or combination of blocks to cover a particular number of elements in a row, and the numeral on the first uncovered element will form the answer.

Once the student has grasped the significance of the numeral system, addition may easily be taught by grouping the blocks together in a single row. For example, placement of the block numbered "1" and "2" over the block numbered "1" in row 20A will form the answer "3"; thus, one unit plus 2 units added to it will equal 3. Of course the reverse operation is employed in teaching subtraction so that, removal of the two-unit block from a position above the single unit block numbered "1" will provide the answer "1."

Multiplication and division problems are necessarily more involved but are made comparatively simple through the application of the present invention in that, again, only a single row of elements is necessary in solving a problem in multiplication. Blocks containing the same number of units are combined to form the answer. As an example 2 times 3 would involve the combining, in vertical relation, of either three two-unit blocks or two three-unit blocks. By stacking the blocks in a row the first uncovered element will reflect the answer "6." Division is taught by showing the relationship of the units in multiplication. For example, it can be illustrated that in determining the answer "6," the result is divisible into either three two-unit blocks or two three-unit blocks. Accordingly, 6 divided by 2, or ½ of 6, would be one three unit block, or "3," whereas one-third of 6 would be one two-unit block, or "2."

It will be apparent from the foregoing that the principles of the present invention may be carried out either through provision for a single row of objects or elements, or through multiple rows of elements as illustrated. Of course in providing for multiple rows the learner is permitted to note the relationship between the numerals as the blocks are placed across the board and also, it permits the child to use his imagination in placing the blocks in various positions.

The principal feature of the present invention is of course the numbered relationship of the elements wherein the numeral on each element on the board represents the physical number of preceding elements. And it will be evident that this principle may be effectuated in various ways in accordance with the present invention. For example, in place of a row of stationary elements 18, a string of elements may be provided wherein each of the elements may be individually manipulated such as by turning over or shifting or otherwise adjusting to hide the numerals so that the first exposed numeral not so hidden will represent the physical number of elements hidden. It will be further obvious that the blocks may assume various forms, colored or not colored, numbered or not numbered, if desired, since it is the primary purpose of the block only to hide a particular number of numerals on the board and in a particular row. Moreover, it is not necessary that the numerals be positioned directly on the elements and blocks but of course may be otherwise directly associated with the elements such as by placement along the side of each element.

Any characters or symbols may be employed in place of standard numerals, for example in teaching the mentally or physically handicapped such as the blind, and in this connection the preferred form of the present invention has been found to be especially effective since the placement of the blocks over a certain element or elements does tend to improve dexterity and interest in the young child.

There has thus been disclosed an educational device in which a presentation of numerals and their quantitative meaning in units are so constructed and arranged as to permit the young student to more easily and readily grasp and learn the fundamentals of arithmetic including the solution of addition, subtraction, multiplication and division problems, and it is to be understood that the present invention is not to be limited to the precise form of invention as hereinbefore described, but that variations in form and construction may be devised within the scope of the present invention, as defined by the appended claims.

What is claimed is:

1. In an educational device providing at least one row of stationary objects each including a numeral associated therewith and with the numerals arranged to progress by a constant difference of one beginning with zero, a displaceable block for covering a predetermined number of said objects in each row beginning with the lowest numbered object, said block defining a plurality of connectable units with each unit proportioned for disposition over an object and each bearing a numeral so that the highest numbered unit and the first exposed object bear the same numeral designating the physical number of objects covered by said block.

2. An arithmetical computing device comprising, a base panel including an inset portion, and said inset portion defining a flat surface lineated into a plurality of rows of elements each element bearing a numeral, said numerals progressing in sequential order, a plurality of displaceable blocks each corresponding with a predetermined number of elements in a particular row, said block being divided into a plurality of units with each unit being proportioned for disposition over one of said elements so that the first exposed element in each row bears the numerical quantity of units in the row.

3. An arithmetical computing device comprising, a base panel including an inset portion, said inset portion defining a flat surface lineated into a plurality of rows of rectangular elements each element bearing a numeral, the elements in each row being arranged so that numerals progress in sequential order, a plurality of displaceable blocks each corresponding in length with a selective number of elements in a particular row, said blocks being divided into a plurality of numbered units proportioned for disposition over a predetermined number of said elements so that the first exposed element in each row bears the numerical quantity of units and hidden objects in the row.

4. An arithmetical computing device comprising, a base panel including an inset portion, said inset portion defining a flat surface lineated into a plurality of rows of rectangular elements each element bearing a numeral, the elements in each row being arranged with said numerals progressing in sequential ascending order by a constant difference of one beginning with zero, a predetermined number of elements in each row being colored, a plurality of displaceable blocks each corresponding in color and length with the color and length of the colored elements in a particular row, said blocks being divided into a plurality of numbered units, each unit proportioned for disposition over one of said elements with the highest numbered unit and the first exposed element bearing a numerical quantity relating to the physical number of units and the number of covered elements in the row.

5. An arithmetical computing device adapted for solving basic arithmetical problems including addition, subtraction, multiplication and division comprising a base panel including a compartment, said compartment having a flat surface lineated into a plurality of rows of rectangular elements each element bearing a numeral arranged with the numerals progressing by a constant difference of one, beginning with zero, a predetermined number of elements in each row being colored so that the colored elements ascend in stepped relation laterally across said flat surface, a plurality of displaceable blocks each corresponding in color and length with the color and length of the colored elements in a particular row, said blocks being divided into a plurality of units, each unit proportioned for disposition over one of said elements and with the first exposed element in each row bearing the numerical quantity relating to the physical number of units in the row.

6. An arithmetical computing device comprising a flat surface portion lineated into a plurality of rows of elements with each element bearing a numeral, said numerals progressing in sequential order, a plurality of displaceable blocks each corresponding with a predetermined number of elements in a particular row, each block being divided into a plurality of units with each unit corresponding in area to each of said elements so that the first exposed element in each row reflects the physical quantity of units in the row.

7. In an educational device providing a series of objects in a row, each object bearing a numeral and the numerals progressing in ascending order by a constant difference of one beginning with zero, and means associated with said objects to provide for covering the numerals of a selected number of objects in order beginning with zero, the exposed numeral of the first object above said means reflecting the physical number of preceding objects having covered numerals.

8. In an educational device providing at least one row of stationary objects each bearing a numeral, the numerals progressing in ascending order by a constant difference of one beginning with zero, a displaceable member for each row of objects being defined by at least one unit, each unit corresponding in area to that of an object so that each member covers at least one object in a row beginning with the zero numbered object, the numeral of the first exposed object above the displaceable member and the covered objects in each row reflecting the physical number of units comprising the displaceable member and the physical number of covered objects, respectively.

9. In an education device according to claim 8 wherein each stationary object is square and each unit of the displaceable member is in the form of a block.

References Cited in the file of this patent

UNITED STATES PATENTS

| | | |
|---|---|---|
| 1,594,376 | Passmore | Aug. 3, 1926 |
| 2,472,439 | Rogers | June 7, 1949 |
| 2,494,469 | Booth | Jan. 10, 1950 |

FOREIGN PATENTS

| | | |
|---|---|---|
| 140,924 | Australia | Apr. 23, 1951 |
| 142,212 | Great Britain | May 6, 1920 |
| 265,451 | Germany | Oct. 8, 1913 |
| 641,771 | Great Britain | Aug. 16, 1950 |
| 3,123 of 1909 | Great Britain | Feb. 3, 1910 |